(12) United States Patent
Scott

(10) Patent No.: US 6,350,967 B1
(45) Date of Patent: Feb. 26, 2002

(54) ENERGY SAVING WATER HEATER CONTROL

(75) Inventor: Allen W. Scott, Jonesborough, TN (US)

(73) Assignee: American Water Heater Company, TN (US)

( * ) Notice: Subject to any disclaimer, the term of this patent is extended or adjusted under 35 U.S.C. 154(b) by 0 days.

(21) Appl. No.: 09/578,146

(22) Filed: May 24, 2000

(51) Int. Cl.[7] .................................................. H05B 1/02
(52) U.S. Cl. ........................ 219/497; 219/486; 219/508; 219/485; 392/454
(58) Field of Search ................................. 219/497, 483, 219/486, 485, 501, 508, 494; 236/20 R, 25 R; 392/454; 307/117

(56) References Cited

U.S. PATENT DOCUMENTS

| | | | |
|---|---|---|---|
| 4,012,734 A | 3/1977 | Jagoda et al. ............ | 340/310 A |
| 4,153,936 A | 5/1979 | Schmitz et al. ............. | 364/493 |
| 4,948,948 A | * 8/1990 | Lesage ........................ | 219/329 |
| 5,056,712 A | * 10/1991 | Enck .......................... | 236/20 R |
| 5,526,776 A | 6/1996 | Fenn et al. ............... | 122/367.3 |
| 5,660,328 A | 8/1997 | Momber .................... | 236/20 R |
| 5,761,083 A | 6/1998 | Brown, Jr. et al. ......... | 364/492 |
| 5,866,880 A | 2/1999 | Seitz et al. ................. | 219/483 |
| 5,948,304 A | 9/1999 | Bradenbaugh .............. | 219/496 |
| 5,968,393 A | * 10/1999 | Demaline .................... | 219/492 |
| 6,002,114 A | 12/1999 | Lee .............................. | 219/501 |

* cited by examiner

Primary Examiner—Mark Paschall
(74) Attorney, Agent, or Firm—Schnader Harrison Segal & Lewis LLP

(57) ABSTRACT

A water heater of the invention includes a water container; an element located to heat water in the water container; a sensor located to sense temperature; and a controller, the controller monitors the sensed temperature and compares the sensed temperature against a control temperature, with the controller further adjusting the control temperature a defined amount when the sensed temperature varies a desired amount from the control temperature.

24 Claims, 6 Drawing Sheets

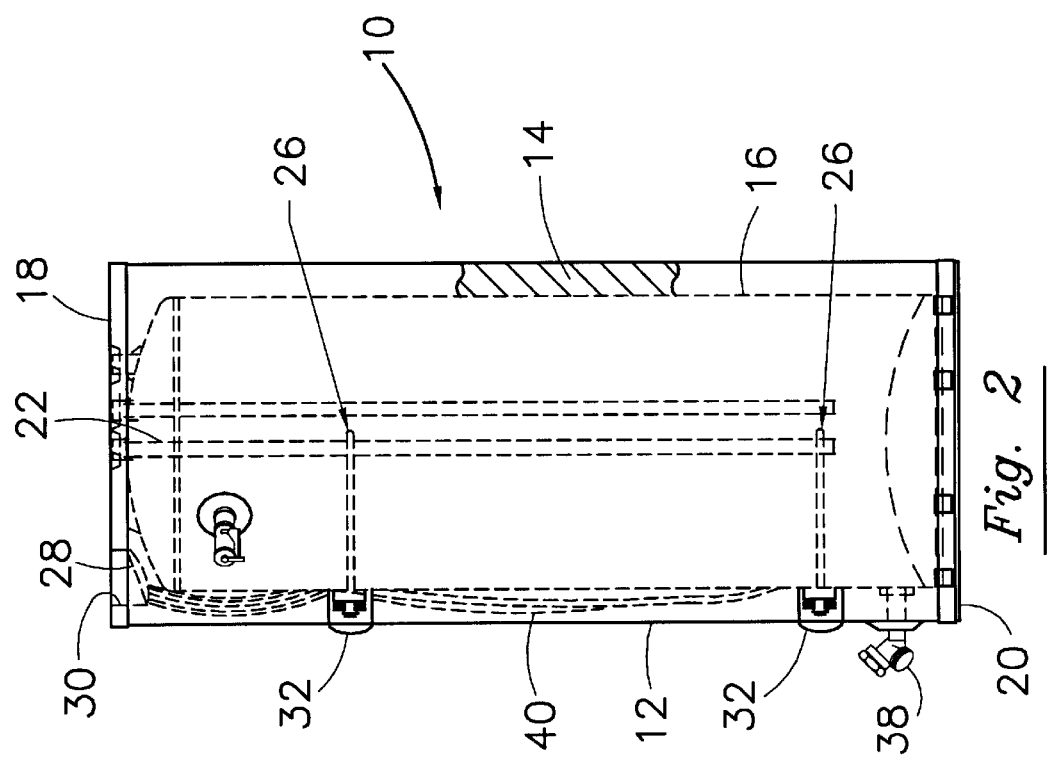
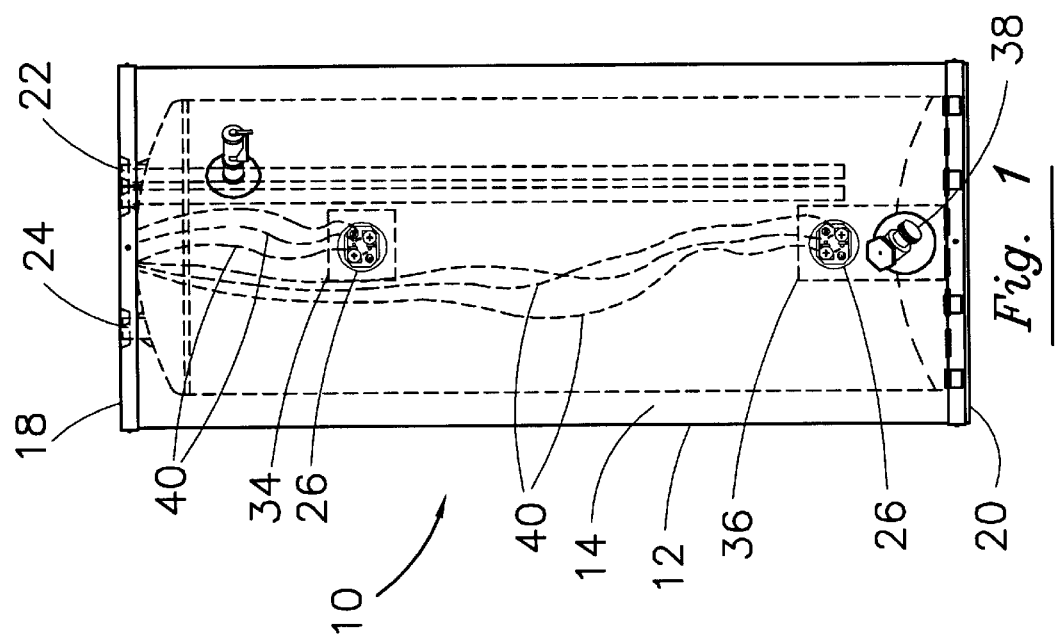

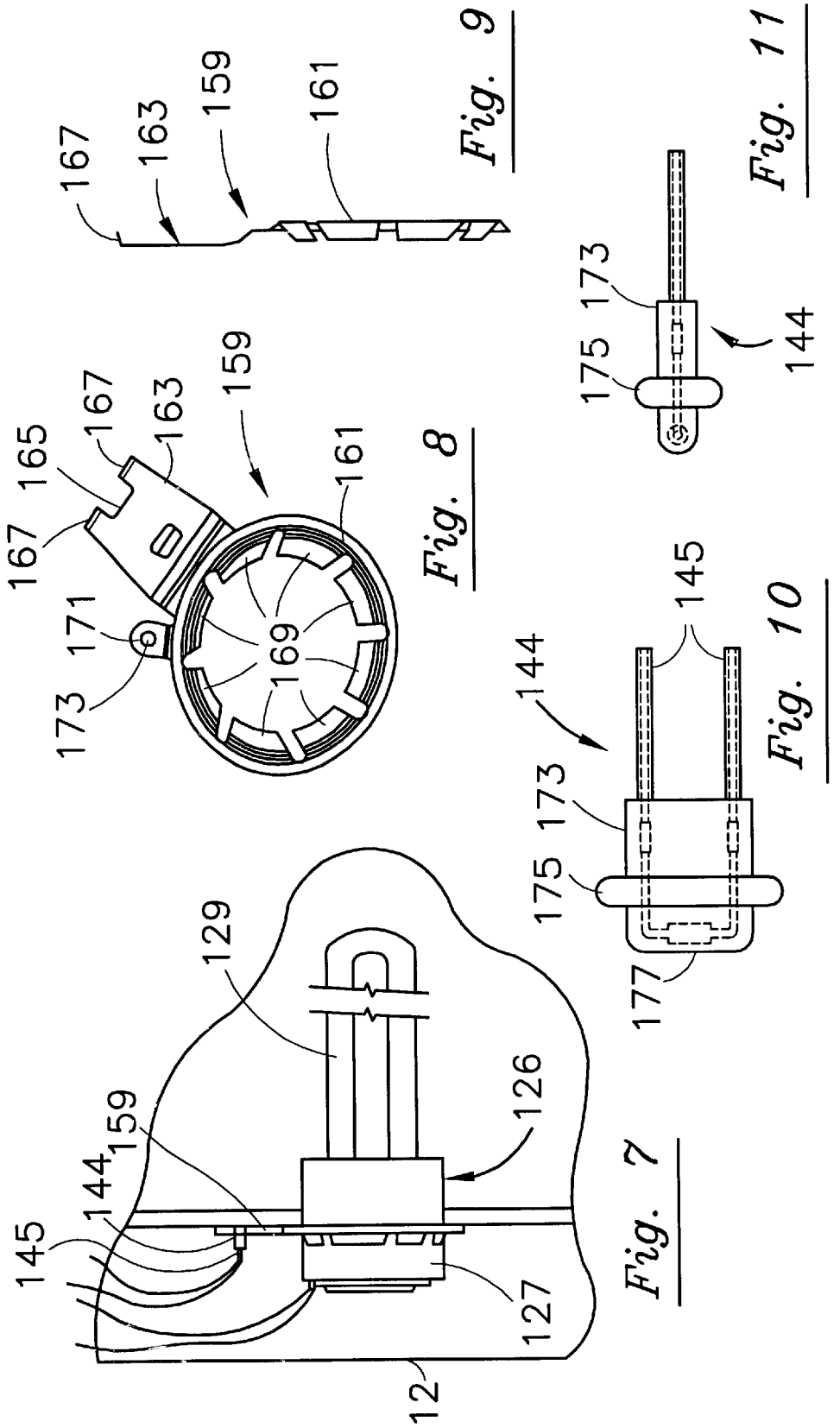

ENERGY SAVING WATER HEATER CONTROL

FIELD OF THE INVENTION

This invention relates to water heaters, particularly to electric water heaters having an electronic control system.

BACKGROUND

Typical electric water heaters are constructed with one or two electric-powered heating elements to heat water in the water tank, depending on the size and utilization of the water heater. Each element is ordinarily mounted onto a side wall of the tank. Further, in designs incorporating two elements, the elements are typically mounted onto the tank at spaced separation from one another. There are a number of disadvantages associated with such constructions. Many electric water heaters are not energy efficient and accordingly are expensive to operate. Some electric water heaters attempt to provide for more efficient operation, however, these devices are either complex in design or are difficult to implement.

This invention has been developed in view of the foregoing to overcome the deficiencies of the prior art.

SUMMARY OF THE INVENTION

In one aspect, the water heater includes a water container; at least one element located to heat water in the water container; at least one sensor located to sense temperature of the water; and a controller operating the at least one element based on a comparison of the sensed temperature and a control temperature.

In still another aspect of the present invention, there is a water heater that includes a water container; a pair of elements located to heat water in the water container; a pair of sensors located to sense temperature of water in the water container; and a controller comparing temperature information received from each of the respective sensors against a control temperature to determine element operation.

Other advantages of the various embodiments of the invention will become apparent to those skilled in the art from the drawings, the detailed description of the invention and the appended claims.

BRIEF DESCRIPTION OF THE DRAWINGS

FIG. 1 shows a schematic front elevational view of a water heater in accordance with aspects of the invention wherein dashed lines show interior portions of the water heater.

FIG. 2 shows a schematic side elevational view, taken partly in section, of the water heater of FIG. 1.

FIG. 7 shows a schematic side elevational view, taken partly in section, of another embodiment of a heating element in accordance with the water heater of FIG. 1.

FIG. 8 is an isolated perspective view of mounting bracket in accordance with the heating element of FIG. 7.

FIG. 9 is a side elevational view of the mounting bracket of FIG. 8.

FIG. 10 is an isolated top plan view of a sensor in accordance with the heating element of FIG. 7.

FIG. 11 is a side elevational view of the sensor of FIG. 10.

DETAILED DESCRIPTION OF THE INVENTION

Figure 3:
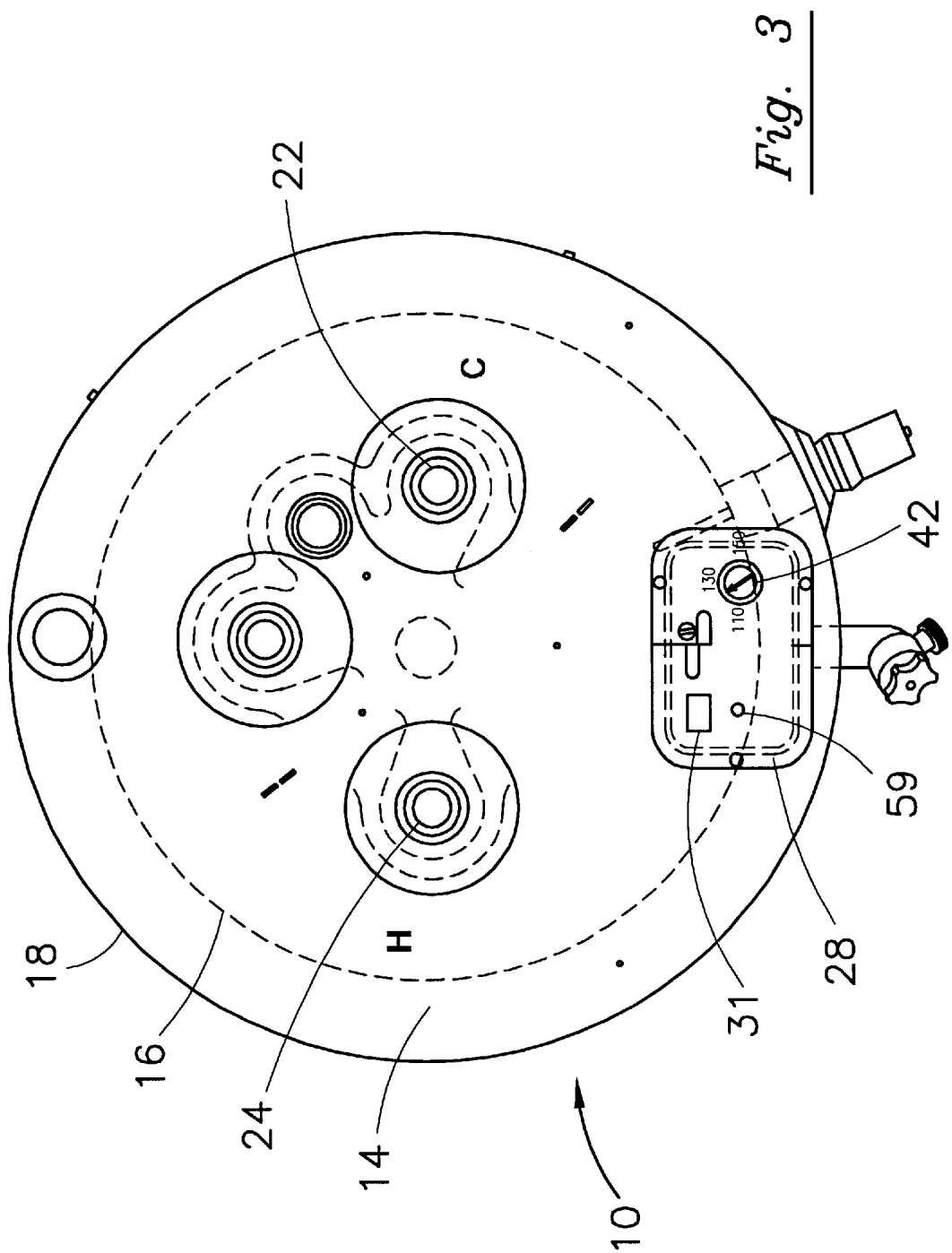
FIG. 3 shows a schematic exploded top view of the water heater shown in FIG. 1 and a user interface.
Figure 4:
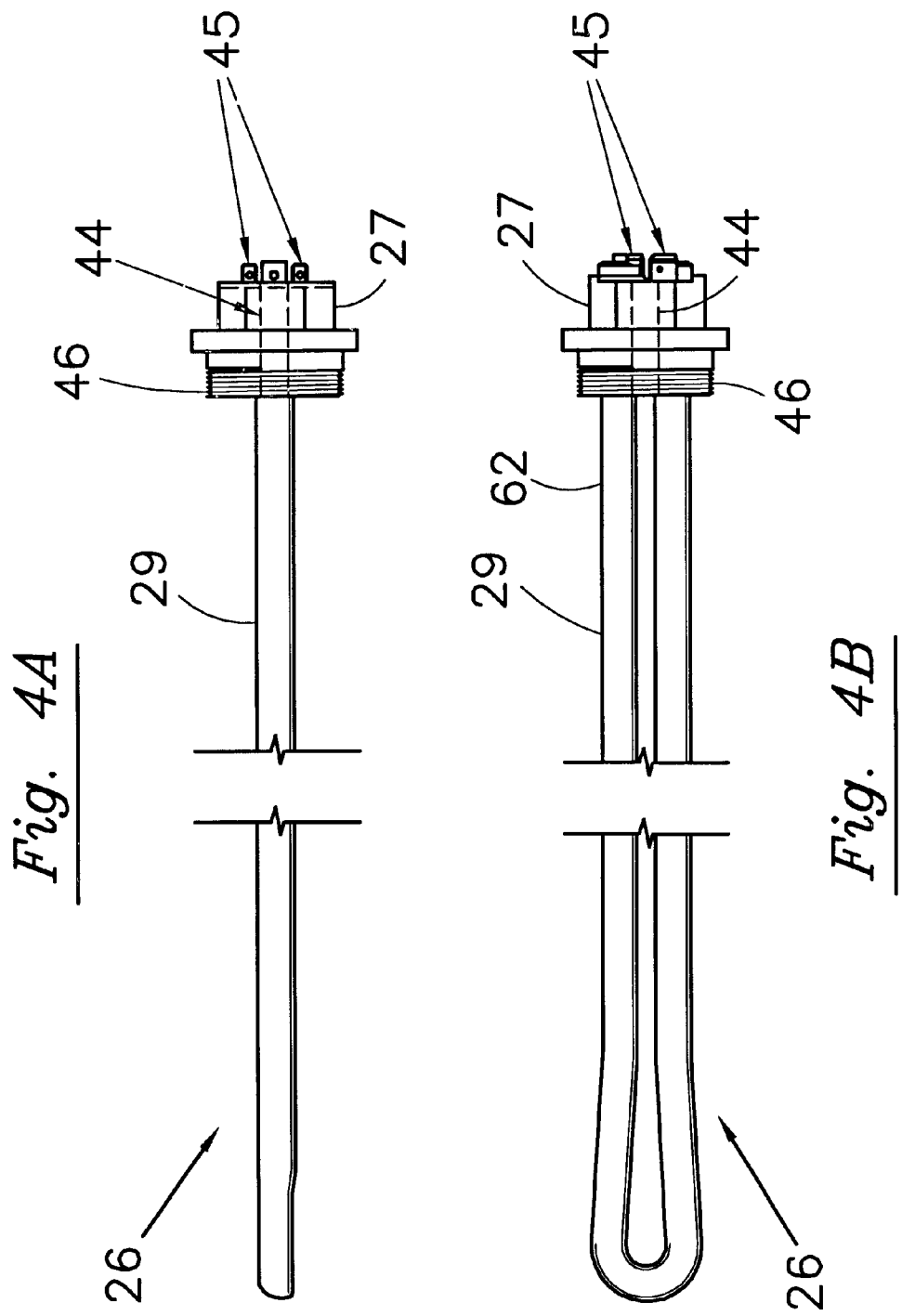
FIGS. 4A and 4B show side and front elevational views, respectively, of a heating element utilized in accordance with aspects of the invention.

It will be appreciated that the following description is intended to refer to the specific embodiments of the invention selected for illustration in the drawings and is not intended to define or limit the invention, other than in the appended claims.

Turning now to the drawings in general and FIGS. 1–4B in particular, the number "10" designates an electric water heater of the invention. Water heater 10 includes an outer jacket 12 which surrounds foam insulation 14. Foam insulation 14 surrounds water tank 16. A top pan 18 caps jacket 12 on its upper end and bottom pan 20 caps jacket 12 on its lower end. An inlet 22 in the upper portion of tank 16 provides for cold water to enter the tank through a dip tube 23. Similarly, outlet 24 allows for hot water to exit through the upper portion of tank 16.

Water heater 10 also includes one or more heating elements, which can comprise any commercially available heating element. A pair of heating elements 26 are mounted to tank 16 and preferably to the side of tank 16. Elements 26 are electrically connected to an electronic controller 28 located in this embodiment in a recessed portion 30 of top pan 18 or the electronic controller 28 can be located in an enclosure on top of pan 18. Elements 26 are mounted to the side wall of tank 16 by any of a variety of means well known to those of ordinary skill in the art, such as threads 46, and are preferably covered by plastic caps 32 which snap into position through openings in jacket 12. An upper foam dam 34 surrounds upper element 26 and extends between tank 16 and jacket 12. Similarly, lower foam dam 36 surrounds element 26 and spigot 38. Foam dam 36 also extends between jacket 12 and tank 16.

Each heating element 26 in the present embodiment includes a base 27, a resistance heater 29, a thermistor sensor 44 and a pair of thermistor connectors 45. The thermistor 44 is located at the base 27 between opposing legs of the resistance heater 29. Electronic controller 28 connects to elements 26 by way of wires 40. In other embodiments not shown, the electronic controller 28 can be in wireless communication with elements 26, such as by RF, infrared or other suitable medium. Wires 40 extend between electronic controller 28 and elements 26 through the space between jacket 12 and tank 16. That space is otherwise filled with insulation 14. It is possible for wires 40 to be located such that foam-forming liquids form directly around wires 40 during the foaming process. Also, wires 40 can be located within a passageway created within the foam, if desired, such as with tubes, pipes and the like. Electronic controller 28 is a user interface and in the present embodiment includes a water temperature adjustment dial 42 which can be rotated to select a variety of water temperatures at which the water within tank 16 will be maintained.

Figure 5:
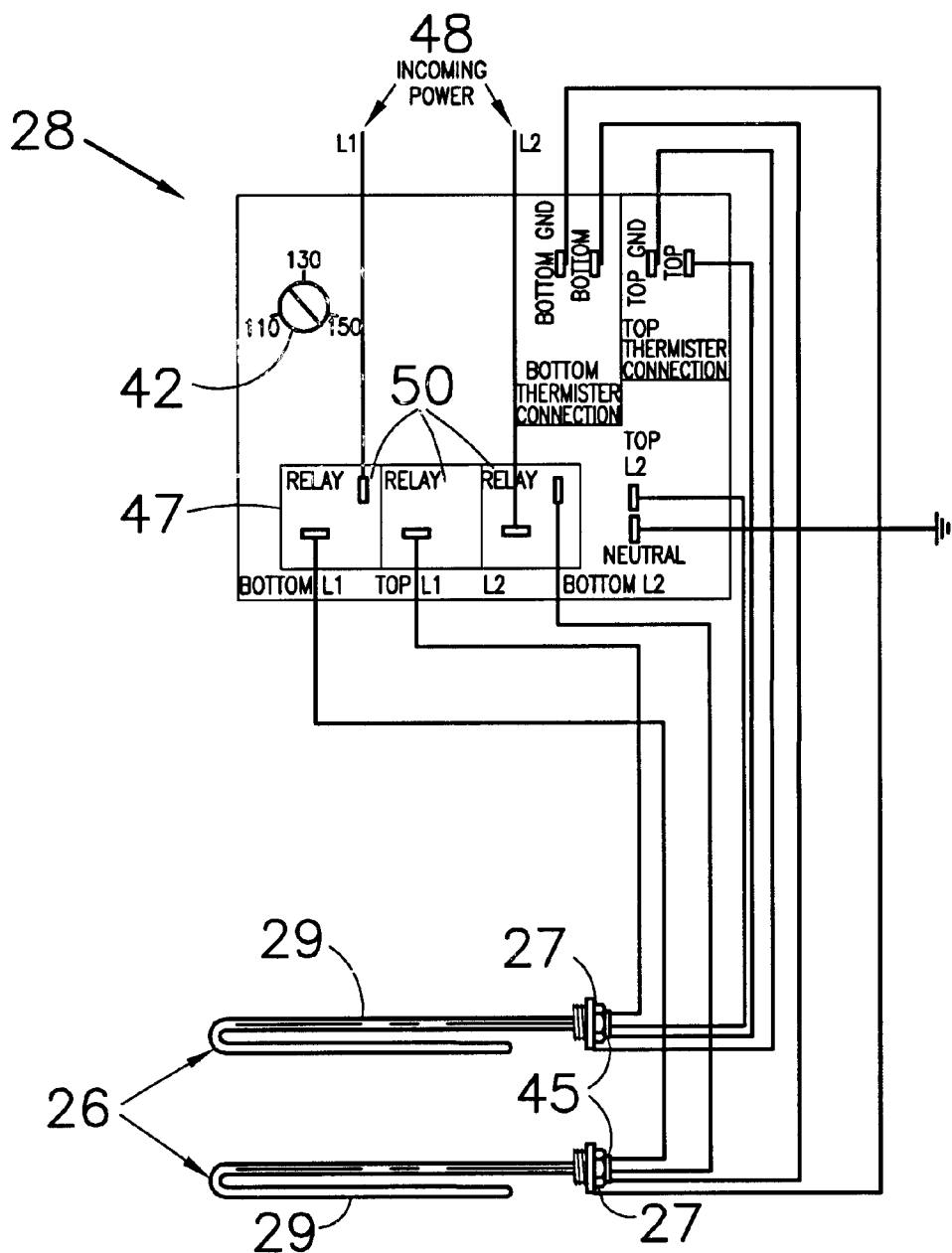
FIG. 5 discloses a circuit diagram of the control system of a water heater in accordance with aspects of the invention.
Figure 6:
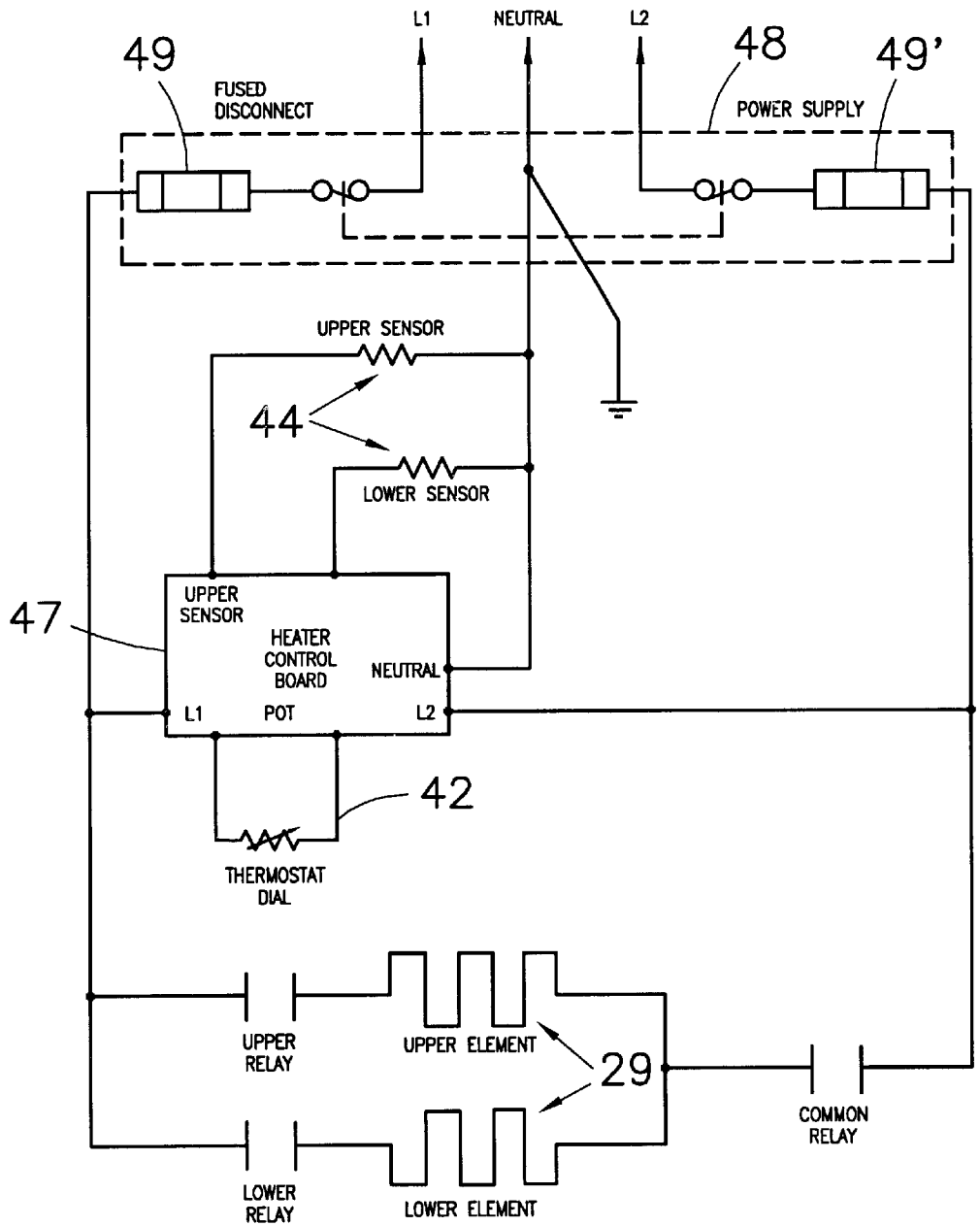
FIG. 6 shows a ladder diagram of the control system of a water heater in accordance with aspects of the invention.

The specifics of the connections and operations of one embodiment of the electronic controller 28 and heating elements 26 are shown in FIGS. 5 and 6. Thermistor 44 is connected in a conventional manner through thermistor connectors 45 to electronic controller 28. Resistance heater 29 is also connected to heater control board 47 via relays 50 on heater control board 47. Electrical power is supplied to the system through power supply 48, which include fuses 49 and 49'for de-energizing the system in the event of an amperage surge.

Heater control board 47 preferably incorporates electronic control circuitry for controlling operation of the water heater, as described in more detail below. Such control circuitry may incorporate a number of electronic components, known to those of ordinary skill in the art, such as solid state transistors and accompanying biasing components, or one or more equivalent, programmable logic chips. The electronic control circuitry may also incorporate a programmable read only memory (PROM), random access memory (RAM) and a microprocessor. The arrangement and/or programming of these components may take any number of forms well known to those of ordinary skill in the art to accomplish operation of the water heater as described below.

When there is a call for hot water, hot water exits through outlet 24 and cold water is introduced through inlet 22. Thermistors 44 detect the temperature of water within tank 16 at positions interior of the water tank side wall. The temperatures of bases 27 reflect the temperature of water in tank 16. Thermistors 44 then send temperature information, typically in the form of an electrical signal, to controller 28.

Controller 28 in one embodiment is programmed with predetermined differential temperatures to determine the temperature at which controller 28 energizes element 26. The predetermined differential can be made to be variable if desired. When the temperature of the water within tank 16 decreases to that predetermined differential, controller 28 detects such temperature information received from thermistor 44 and energizes element 26. Element 26 continues in the energized state to heat the water until temperature information received from thermistor 44 indicates that the water temperature has reached a predetermined set point.

The predetermined set point can be selected by adjustment dial 42 and is variable. When controller 28 detects that the predetermined set point has been reached, controller 28 de-energizes element 26. The predetermined set point typically has variable settings for de-energizing elements 26. Such selectable settings are preferably between about 90° F.–180° F. The differential for energizing the elements can vary depending on the task to be performed.

In accordance with another embodiment of the invention, the controller 28 is programmed to utilize the lower thermistor 44 to verify operation of the upper thermistor 44. In that embodiment, the upper thermistor 44 is used to preferably both detect over temperature conditions as well as control the function of the upper element 26. For this reason, safety considerations of the system require that correct readings are made by the upper thermistor 44.

The controller 28 monitors the temperatures detected by the upper and lower thermistors 44 at predetermined times and intervals to verify operation. Preferably, the programming of the controller 28 prompts either a status indicator and/or regulates operation of the water heater depending on a comparison of the differences between the temperatures detected by the upper and lower thermistors 44 with a preset value stored in the controller 28. For example, in one especially preferred embodiment, the controller 28 is programmed to compare the temperatures of the upper and lower thermistors 44 each time the lower element 26 is turned off. In this illustrated embodiment, the temperatures measured by the upper and lower thermistors 44 at the time just after the lower element 26 is switched off should be about the same. The reason is that the electric water heater 10 will not "stack". Stacking is a temperature gradient from bottom to top of the tank. For example, upon heating of the water in the tank 16 in operation, the upper element 26 will reheat water at the top of the tank very fast and the lower element 26 will heat the water in the lower portion of the tank much more slowly. As the water in the lower portion of the tank 16 approaches the set point, convection currents from the elements 26 start to mix the hot water at the top of the tank 16 with the warm water in the lower portion of the tank 16. Eventually, preferably the convection currents circulate the water in the entire tank 16, so that the water throughout tank 16 is of a substantially uniform temperature, and more preferably, at a uniform temperature when the lower element 26 is shut off.

In the present embodiment, the controller 28 is preferably programmed to shut down and more preferably to also send an error indicator where in two consecutive reads there is detected a ten degree Fahrenheit or greater difference between the upper and lower thermistors 44 at the point when the lower element 26 is shut off. As should be understood, the controller 28 can be programmed to shut down the system and/or send an error indication at any desired temperature difference between the upper and lower thermistors and after any desired amount of repeatability. In this manner, both failure of the upper thermistor 44 as well as malfunction or other improper operating condition can be detected. For example, thermistors normally fail open or shorted and they rarely fail in a manner that will cause the resistance to increase but not go open. In some instances, it is possible that the thermistor is not making good contact with the tank or is exposed to a low ambient temperature which causes the thermistor to give an incorrect reading.

Preferably an additional feature of the water heater 10 is that failure of either one or both of the upper and lower elements 26 can also be detected, although as should be understood, each of these features are not required to be provided together in a single embodiment. For this purpose, the controller 28 is programmed to monitor changes in water temperature over time adjacent and preferably just above an element being energized. In that case, the controller 28 monitors both the upper and lower thermistors 44 above the respective upper and lower elements 26. The controller 28 is programmed to monitor, over a defined time period following energizing of the corresponding elements 26, the changes in temperature detected by each of the thermistors 44 against a predetermined temperature.

The defined time period is set at one hour and the predetermined temperature is set at two degrees, although as should be understood, the controller 28 can be programmed having a defined time period of any desired duration and a predetermined temperature of any desired level. For example, any longer or shorter time duration or any higher or lower temperature is possible. Further, the controller 28 is preferably programmed to identify when the change in temperature detected by either the upper or lower thermistor 44 does not increase to at least reach the predetermined temperature by the end of the defined time period, which signifies that a respective element is defective.

In this embodiment, the controller 28 identifies when the change in temperature sensed by a thermistor 44 does not reach two degrees in the one hour following energizing of the corresponding element 26. In addition, the controller 28 can also be programmed to take further steps when a defective element is identified. The controller 28 is programmed to both send an error indication when a defective element is identified and continue operation of the water heater 10, preferably using the other element 26.

The following will explain in detail the operation of controller 28 in accordance with a preferred embodiment following the detection of failure of either one of the upper and lower elements 26. Upon failure of the lower element 26, the controller 28 continues to operate the water heater 10 in the same manner as before the failure detection. In this manner, the water temperature in the top of tank 16 remains hot due to heating by the upper element 26. After a prolonged period of operation, there will be a reduction in the amount of hot water available from the water heater 10. In this embodiment, the controller 28 is programmed to send an error indication on failure of either one of the elements 26, which will be described in detail below. Accordingly, in operation following failure of the lower element 26, the user will notice a reduced amount of hot water available, which will alert the user of a potential problem even if the error indication was not received or noticed by the user.

Upon failure of the upper element 26, the controller 28 operates to give the lower element 26 priority, which effectively turns off the upper element 26 and heats the water in tank 16 with only the lower element 26. The water heater 10 will again continue to operate in this manner until the user receives and/or notices an error indication or the user notices a reduction in the amount of available hot water.

As indicated above, the water heater 10 is preferably adapted so that the controller 28 will send an error indication upon detection of sensor and element failure or malfunction. In accordance with this feature, any conventionally known visual and/or audible alarm can be used for this purpose. In one especially preferred embodiment, the water heater 10 includes a visual display associated with the controller 28. As shown in FIG. 3, the visual display 59 preferably is an LED display and is mounted on the heater control board 47, although other types of displays can also be provided and mounted at other locations on water heater 10.

In operation, one or a plurality of conventionally known LED devices can be utilized for this purpose, which are visible outside the junction box housing the controller 28. In this embodiment, a single LED is provided and operates in the following manner. The LED emits a steady glow when there are no detected system problems. An error signal from the controller 28 on detection of a system problem causes the LED to emit a flashing light. In addition, preferably the controller 28 is programmed so that the error signal will cause the LED to emit a specific flash sequence depending on the nature of the system problem, for example, "dry fire", thermistors open or shorted, failed elements and thermistors that are out of calibration or giving incorrect readings. As should be understood, the feature of a display is optional and may be eliminated where desired.

In another embodiment of the invention, the water heater 10 can include an energy saving feature. The controller 28 is programmed to operate the water heater 10 in an energy saver mode. The water heater 10 can operate either exclusively in the energy saver mode or include an energy saver cycle as an option that can be selected from various operational modes. For example, the controller 28 may be programmed to operate the water heater 10 in either a normal cycle or an energy saver cycle. In the normal cycle, the controller 28 operates by attempting to maintain the water in tank 16 at a substantially constant temperature or more preferably at a constant temperature. As indicated earlier, the controller 28 monitors the temperatures of one or more thermistors 44 and then compares the monitored temperatures against a pre-set value to control the respective elements 26. The selection of the normal cycle and energy saving cycle can be incorporated into an adjustment dial, such as dial 42 shown in FIGS. 1 and 2.

In the energy saver cycle mode, the controller 28 is programmed to adjust the water temperature in tank 16 to reduce energy usage but also provide sufficient hot water. For this purpose, preferably the controller 28 compares the monitored temperature by the one or more thermistors 44 against a programmed control temperature or pot set point to control the operation of the respective one or more elements 26. The controller 28 then adjusts the control temperature a defined amount when the monitored temperature varies a desired amount from the control temperature. The defined amount of adjustment of the control temperature and the corresponding desired amount of variation between the monitored temperature and control temperature can both be pre-programmed in the controller 28. In embodiments where there are multiple elements 26 and sensors 44, such as illustrated in FIGS. 1–11, the controller 28 preferably adjusts the control temperature a defined amount when the monitored temperature of either the first or second sensors varies a desired amount from the control temperature.

In accordance with an especially preferred embodiment, the controller 28 in the energy saver cycle will initially operate to maintain the temperature of the water in tank 16 at a substantially constant control temperature, or more preferably at a constant control temperature. The controller 28 is programmed to reduce the control temperature by a defined amount each time the lower element 26 calls for heat. In one embodiment, the defined amount of the temperature reduction is 0.2 degrees Fahrenheit, although as should be understood, the defined amount of the temperature reduction can be any interval.

In addition, preferably the controller 28 monitors the sensed temperature of the lower sensor 44 and compares that sensed temperature against the control temperature to control the operation of the lower element 26. The controller 28 is programmed to turn on the lower element 26 when the sensed temperature is a desired amount less than the control temperature. The element 26 is turned on to operate where the sensed temperature is any temperature less than the control temperature, although any other interval can be selected to initiate operation of the lower element 26. As indicated above, the controller 28 is programmed to reduce the control temperature each time the lower element 26 calls for heat. In other embodiments, the controller 28 can be programmed to reduce the control temperature based on other factors, such as, the control temperature would be reduced every other time the lower element 26 calls for heat, etc.

After continued operation of the water heater 10 in the energy saver cycle, the temperature of the water in tank 16 is lowered from the initial control temperature to a lower point due to the temperature adjustments. This particular sequence will continue until the temperature of the water in the upper portion of the tank 16 is reduced to a point where the upper element turns on; for example, which can occur over time due to heat loss but is primarily a result of hot water usage. For instance, ordinarily hot and cold water are blended together to obtain a desired temperature. The ratio of the hot water to the cold water depends on the temperatures of the respective hot and cold water. As the control temperature is lowered over time, a higher proportion of hot water will be used in the hot water/cold water blend. Accordingly, as the temperature of the hot water is reduced, the volume of hot water usage will increase. At the point when the upper element 26 turns on, there is still hot water left in tank 16, but it is undesirable to increase usage beyond this point to insure sufficient amounts of hot water in subsequent usage periods.

The controller 28 is programmed in this embodiment to raise the control temperature up by a defined amount when the upper element 26 is energized to turn on and heat the water in tank 16. The defined amount the control temperature is raised is 3 degrees Fahrenheit in one preferred embodiment, although any other suitable interval can be used where desired. As indicated above, the controller 28 can be programmed to monitor the sensed temperature of the upper thermistor 44 and then compare the sensed temperature against the control temperature to control the operation of the upper element 26. The controller 28 in this embodiment will energize the upper element 26 and raise the control temperature when the sensed temperature is a desired amount less than the control temperature, which corresponds to any temperature below the control temperature in this embodiment.

The cycle of several adjustments in temperature downward followed by a step up in temperature results with the stored water temperature reaching an equilibrium point, which provides a water storage temperature high enough to meet individual needs without being too high. In the foregoing embodiment, the controller 28 lowers the temperature 0.2 degrees Fahrenheit each time the lower element 26 is activated and raises the control temperature 3 degrees Fahrenheit when the upper element 26 comes on.

The water temperature will reach an equilibrium point where 1 in 15 draws is large enough to cause the upper element 26 to come on. However, if the step up is modified to be 2 degrees Fahrenheit, the ratio will then be 1 in 10 draws. Accordingly, the values of the down step and up step will change the equilibrium point and speed of temperature swings in the tank 16. As indicated earlier, any desired ratio of down step to up step can be used and the size of each down step and up step can be any desired interval.

Further, the amount of water usage relative to the size of the water tank is also relevant to the equilibrium point. In embodiments where an oversized water tank is used relative to the amount of water usage, the reduction in temperature can be significant. In embodiments where a barely adequate or undersized water tank is used to support the amount of water usage, the upper element will come on more often than 1 in 15 draws and the water temperature will not be lowered.

There are also preferably upper and lower limits to the number of draws for the upper element 26 to turn on. For example, a user will likely start to experience no hot water beyond a ratio of 1 in 5 draws for the upper element 26 to turn on. At the other extreme, if the down step is so small, such that only 1 draw in 100 will cause the upper element 26 to come on as an example, the reduction in the storage temperature will be minimal.

In addition, preferably the size of the up step can be as low as 1 degree or as large as 10 degrees. For example, it is seen that step changes in water temperature above 10 degrees can be irritating and dangerous to the user. Nonetheless, a smaller or larger up step can be utilized where desired in this embodiment and used in other embodiments as well.

Further, in this embodiment, preferably the control limits of the up and down steps are limited by the resolution of the digital controller and water is not stored at a temperature below about 110 degrees Fahrenheit. Temperatures below 110 degrees Fahrenheit are not seen to provide a satisfactory temperature even with 100% hot water flow. Also, preferably the water temperature will not be adjusted hotter than the initial control temperature or pot set point. It is desired that further increasing the water temperature above the pot set point should be a conscious decision of the user and not automatic for safety and other reasons. As should be understood, other maximum and minimum values for the control temperature and intervals can be utilized where desired.

One advantage of this embodiment is that there can be significant energy savings when the stored water temperature is lowered. For example, if a 35 degree control temperature is reduced to 110 degrees Fahrenheit, the reduction in stand by heat loss will be 37.3% in a 68 degree Fahrenheit ambient room. If the room temperature is 80 degrees Fahrenheit, the reduction will then be 45%. This reduction in control temperature reduces total energy costs by about 5% in a typical situation.

The water heater 10 can also include additional features as well where desired. For example, in another embodiment, the controller 28 can also contain a lock-out set point which is preferably less than about 210° F. The control lock-out prevents elements 26 from energizing when the water temperature reaches an abnormal predetermined set point and the controller 28 will not permit energizing of elements 26 until controller 28 is reset by removing power and then subsequently reapplying power. This can be accomplished automatically by controller 28, thereby reducing and possibly eliminating the need for a mechanical reset control. Such a reset could be performed by a reset user interface 31 on controller 28. The sensing capabilities of sensors 44 are such that elements 26 can be energized and de-energize after only approximately 1.5 gallons of water have been drawn from tank 16. This compares to about 3.0 gallons of water removal in prior art constructions.

The following illustrates one particular sequence of operational steps to achieve operation of the water heater. When the water heater control system is first started, the control electronic circuitry of heater control board 47 records the initial temperature at bottom element 26 and then turns on the bottom element 26 for ten seconds and then off for two minutes. Heater control board 47 then records the final temperature of the bottom element 26 as measured through thermistor 44 and calculates the difference between the final temperature and initial temperature.

If the difference between these temperatures is greater than five degrees, then heater control board 47 turns off both elements 26 through relays 50. Heater control board 47 then checks to see if system power has been turned off or reset through incoming power supply 48. Once the system has been reset, heater control board 47 then begins this process from start.

If, however, the temperature differential is less than five degrees, then heater control board 47 energizes bottom element 26 to heat the water in tank 16 until it reaches the temperature set on temperature adjust dial 42.

If the temperature of temperature adjust dial 42 is less than 110° F., then the top element 26 remains off. Otherwise, heater control board 47 checks the temperature at thermistor 44 in upper element 26. If the temperature of thermistor 44 in upper element 26 is equal to the temperature of dial 42 minus 5° F., then heater control board 47 does not energize upper element 26 until the temperature at thermistor 44 in upper element 26 is less than the turn on temperature (which is typically the temperature set on temperature adjust dial 42 minus some increment such as 5°) minus 5° F. Heater control board 47 then energizes top element 26.

Heating of the water in tank 16 then continues in a conventional manner until the turn off temperature of temperature adjust dial 42 is achieved.

By energizing upper and lower elements 26 in the manner described above, there are significant advantages. For example, energizing the element briefly (e.g., about 5–10 seconds) and detecting temperature with a thermistor allows heater control board 47 to prevent elements 26 from being energized for long periods of time in a "dry fire" condition, thereby avoiding substantial degradation of the elements and significantly extending their life. Thus, the terms "substantially no degradation" refers to little or no element degradation that occurs for an element energization period of about 5 seconds and up to about 10 seconds. Energizing the element for longer than about 10 seconds can result in substantial degradation under dry fire conditions. In this manner, if the detected temperature rises quickly over a short time interval, then there is little or no water in tank 16. Alternatively, if there is little or no change in the detected temperature over a short time interval, then there is sufficient water in tank 16.

Use of thermistor 44 also allows for a much more accurate and responsive detection of temperature than the use of more conventional temperature-sensing technology, such as bimetallic strip, although other such conventional temperature-sensing technology can be used where desired. This allows the significant temperature changes which occur in a short period of time under a dry fire condition to be detected with only a short (e.g., about 5–10 seconds) energizing of the heating element 26. In this way, a dry fire condition can be detected virtually immediately to prevent overheating of the element, which significantly reduces its useful life.

Also, use of thermistors 44 eliminates the electromechanical thermostats and their associated foaming aprons, fiberglass batts and the like. Small doughnut-shaped foam dams surround the bases 27 and permit foam insulation to cover more surface area of the tank. The following illustrates an alternative set of operational steps in accordance with this embodiment. In this embodiment of the invention, during control power up of the water heater, heater control board 47 checks to see if there is a need for heating of the water at lower element 26 by measuring the temperature at thermistor 44 and comparing the measured temperature with that of temperature adjust dial 42. If such a demand exists, heater control board 47 energizes lower element 26 and continuously checks to see if the water heating demand is satisfied. Once this heating demand is satisfied, heater control board 47 then repeats this process for the upper element 26.

Another embodiment of the invention is illustrated in FIG. 7. The heating element 126 illustrated in FIG. 7 is shown in a mounted position within the water tank 16 and surrounded by the jacket 12, similar to the heating element 26 described above. For ease of this illustration, the portions of the heating element 126 which correspond to portions of the heating element 26 will be identified using the same number designations except beginning with the number 100.

In this embodiment, each of the heating elements 126 comprises a base 127, a resistance heater 129, a sensor preferably comprising a thermistor sensor 144 and a pair of thermistor connectors 145, and with the heating elements 126 each being connected to the electronic controller 28 (see FIG. 3). The thermistor sensor 144 is spaced from the base 127 and positioned adjacent and preferably engaging an outer surface of the water tank 16. In this embodiment, the positioning of the thermistor 144 is accomplished through use of a bracket 159. As illustrated in FIGS. 8 and 9, the mounting bracket 159 includes an annular mounting ring 161 which is received onto the base 127 and an extension arm 163 attached to the perimeter of the annular ring 161. The extension arm 163 is generally rectangular in configuration and includes a notch 165 at a distal end which is generally rectangular in this embodiment. The extension arm 163 also includes at least one, and in this embodiment, two flanges 167 at the distal end, and with each flange 167 positioned on opposite sides of notch 165. The mounting bracket 159 also includes a plurality of flexible tabs 169 attached with an inner surface of annular ring 161 and extending in a generally inwardly direction. The mounting bracket 159 further includes a tab 171 extending outwardly from the perimeter of annular ring 161 and includes opening 173 extending there through. The mounting bracket 159 can be made from any suitable material and manufacturing process, such as manufactured from stamped metal.

The thermistor 144 in this embodiment is illustrated in FIGS. 10 and 11. The thermistor 144 is encapsulated preferably in glass and defines a generally rectangular body 173 and a collar 175 proximate an end 177 which is distal the connectors 145.

Assembly of the mounting bracket 159 and thermistor 144 will now be described. The thermistor 144 is positioned in notch 165 in the mounting bracket 159. The mounting bracket 159 is secured by the annular ring 161 on the base 127. The mounting bracket 159 is positioned adjacent the water tank 16 in the secured position. The thermistor 144 is located so that end 177 is positioned adjacent and preferably engaging the outer surface of the water tank 16. The position of the thermistor 144 is facilitated by the flanges 167, which preferably engage the outer surface of the water tank 16 in order to stabilize the mounting bracket 159.

The function of the heating element 126 in this embodiment during operation of the water heater 10 will now be described. Contrary to the heating element 26, the thermistor 144 in this embodiment operates by monitoring the temperature of the side wall of water tank 16. The temperature of the side wall of water tank 16 is effected by the temperature of water within the tank 16 as well as the temperature of heating elements 129. For example, when water is present in the tank 16 in the area of the sensor 144, the temperature of the tank 16 will substantially correspond and preferably will be substantially identical to the temperature of the water. In dry fire conditions, the temperature of the tank 15 will be elevated due to the heat from the heating elements 129. In this manner, the thermistor 144 will operate in the same manner as thermistor 44, except the thermistor 144 will not be positioned inside of the tank or come into direct contact with the water in the water heater 10.

Although this invention has been described in connection with specific forms thereof, it will be appreciated that a wide variety of equivalents may be substituted for the specific elements described herein without departing from the spirit of the scope of this invention as described in the appended claims. For example, water tank 16 may be made of a number of sizes and shapes and may be made from a wide variety of materials such as metals and/or plastics. Foam insulation 14 may similarly be made from any number of high energy efficient foam insulations well known in the art.

The bottom of the water tank 16 may have various shapes, either with lower flanges as shown or as a flat construction. Other modifications may be made, including use of foam insulation between the bottom of tank 16 and bottom pan 20. Also, outer jacket 12 may be made from any number of materials such as rolled metals, preferably steel, or extruded vinyl materials and the like. Also, top pan 18 and bottom pan 20 may be deep-drawn, stamped or the like, or be made from metal, plastic or other suitable materials. Various types of heating elements may be utilized so long as they are used in conjunction with thermistor sensors 44.

What is claimed is:

1. An electric water heater comprising:

a water container;

at least one element located to heat water in said water container;

at least one sensor located to sense temperature of water in said water container; and a controller, said controller monitoring said sensed temperature of said at least one sensor and operating said at least one element to turn on to heat water in said water container to a pre-set temperature, wherein said controller further adjusts a control temperature of the water in said water container a defined amount from said pre-set temperature when said at least one element is turned on to heat water in said water container.

2. The water heater defined in claim 1, wherein said controller compares said sensed temperature against said control temperature, with said controller operating said at least one element to turn on to heat water in said water container when said sensed temperature varies a desired amount from said control temperature.

3. The water heater defined in claim 2, wherein said electric water heater further comprises:

a second element to heat water in said water container;

a second sensor located to sense temperature of water in said water container; and wherein said controller monitors said sensed temperature of said second sensor and compares said sensed temperature of said second sensor against said control temperature, with said controller operating said second element based on said comparison, wherein said controller further adjusts said control temperature a defined amount when said sensed temperature of either said first sensor or said second sensor varies a desired amount from said control temperature.

4. The water heater defined in claim 3, wherein said controller lowers said control temperature a defined amount when said sensed temperature of said at least one sensor is a desired amount less than said control temperature, and said controller raises said control temperature a defined amount when said sensed temperature of said second sensor is a desired amount less than said control temperature.

5. The water heater defined in claim 4, wherein said controller adjusts said control temperature over an energy saving cycle, wherein said controller operates over said energy saving cycle by lowering said control temperature more times than said controller raises said control temperature.

6. The water heater defined in claim 5, wherein said defined amount said controller lowers said control temperature is a smaller interval than said defined amount said controller raises said control temperature.

7. The water heater defined in claim 6, wherein said controller adjusts said control temperature anywhere between a maximum control temperature and a minimum control temperature.

8. An electric water heater comprising:

a water container;

a first element located to heat water in said water container;

a second element to heat water in said water container;

a second sensor located to sense temperature of water in said water container; and a controller, said controller monitoring said sensed temperatures of said first and second sensors and comparing said sensed temperature against a control temperature, with said controller operating said first and second elements to heat water in said water container to a pre-set temperature based on said comparison, wherein said controller further adjusts said control temperature a defined amount from said pre-set temperature when said sensed temperature of either said first sensor or said second sensor varies a desired amount from said control temperature.

9. The water heater defined in claim 8, wherein said controller adjusts said control temperature by lowering said control temperature a defined amount when said sensed temperature of said first sensor is a desired amount less than said control temperature, and said controller raises said control temperature a defined amount when said sensed temperature of said second sensor is a desired amount less than said control temperature.

10. The water heater defined in claim 9, wherein said controller adjusts said control temperature over an energy saving cycle, wherein said controller operates over said energy saving cycle by lowering said control temperature more times than said controller raises said control temperature.

11. The water heater defined in claim 10, wherein said controller adjusts said control temperature anywhere between a maximum control temperature and a minimum control temperature over said energy saving cycle.

12. The water heater defined in claim 11, wherein said defined amount said controller lowers said control temperature is a smaller interval than said defined amount said controller raises said control temperature.

13. An electric water heater comprising:

a water container;

a first element located to heat water in said water container;

a first sensor located to sense temperature of water in said water container;

a second element to heat water in said water container;

a second sensor located to sense temperature of water in said water container; and a controller, said controller monitoring said sensed temperatures of said first and second sensors and comparing said sensed temperatures against a control temperature, wherein when said sensed temperature of said first sensor is a desired amount less than said control temperature, said controller operates said first element to heat water in said container and lowers said control temperature a defined amount, and when said sensed temperature of said second sensor is a desired amount less than said control temperature, said controller operates said second element to heat water in said container and raises said control temperature a defined amount.

14. The water heater defined in claim 13, wherein said controller adjusts said control temperature over an energy saving cycle, wherein said controller operates over said energy saving cycle by lowering said control temperature more times than said controller raises said control temperature.

15. The water heater defined in claim 14, wherein said controller adjusts said control temperature anywhere between a maximum control temperature and a minimum control temperature over said energy saving cycle.

16. The water heater defined in claim 15, wherein said defined amount said controller lowers said control temperature is a smaller interval than said defined amount said controller raises said control temperature.

17. An electric water heater comprising:

a water container;

a first element located to heat water in said water container;

a first sensor located to sense temperature of water in said water container;

a second element to heat water in said water container;

a second sensor located to sense temperature of water in said water container; and a controller, said controller monitoring said sensed temperature of said first and second sensors and operating said first and second elements to heat water in said water container;

wherein said controller further adjusts a control temperature of the water in said water container a defined amount when said water in said water container is heated, and wherein said controller lowers said control temperature a defined amount when said sensed temperature of said first sensor is a desired amount less than said control temperature, and said controller raises said control temperature a defined amount when said sensed temperature of said second sensor is a desired amount less than said control temperature.

18. The water heater defined in claim 17, wherein said controller adjusts said control temperature over an energy saving cycle, wherein said controller operates over said energy saving cycle by lowering said control temperature more times than said controller raises said control temperature.

19. The water heater defined in claim 18, wherein said defined amount said controller lowers said control temperature is a smaller interval than said defined amount said controller raises said control temperature.

20. The water heater defined in claim 19, wherein said controller adjusts said control temperature anywhere between a maximum control temperature and a minimum control temperature.

21. An electric water heater comprising:

a water container;

a first element located to heat water in said water container;

a first sensor located to sense temperature of water in said water container;

a second element to heat water in said water container;

a second sensor located to sense temperature of water in said water container; and a controller, said controller monitoring said sensed temperatures of said first and second sensors and comparing said sensed temperatures against a control temperature, with said controller operating said first and second elements to heat water in said water container based on said comparison;

wherein said controller further adjusts said control temperature a defined amount when said sensed temperature of either said first sensor or said second sensor varies a desired amount from said control temperature; and said controller adjusts said control temperature by lowering said control temperature a defined amount when said sensed temperature of said first sensor is a desired amount less than said control temperature, and said controller raises said control temperature a defined amount when said sensed temperature of said second sensor is a desired amount less than said control temperature.

22. The water heater defined in claim 21, wherein said controller adjusts said control temperature over an energy saving cycle, wherein said controller operates over said energy saving cycle by lowering said control temperature more times than said controller raises said control temperature.

23. The water heater defined in claim 22, wherein said controller adjusts said control temperature anywhere between a maximum control temperature and a minimum control temperature over said energy saving cycle.

24. The water heater defined in claim 23, wherein said defined amount said controller lowers said control temperature is a smaller interval than said defined amount said controller raises said control temperature.

* * * * *

UNITED STATES PATENT AND TRADEMARK OFFICE
CERTIFICATE OF CORRECTION

PATENT NO. : 6,350,967 B1
DATED : February 26, 2002
INVENTOR(S) : Allen W. Scott It is certified that error appears in the above-identified patent and that said Letters Patent is hereby corrected as shown below:

<u>Column 11,</u>
Line 62, please insert -- a first sensor located to sense temperature of water in said water container: --

Signed and Sealed this

Twenty-eighth Day of May, 2002

Attest:

Attesting Officer

JAMES E. ROGAN
Director of the United States Patent and Trademark Office